US010264044B2

(12) United States Patent
Bevilacqua-Linn et al.

(10) Patent No.: US 10,264,044 B2
(45) Date of Patent: Apr. 16, 2019

(54) APPARATUS AND METHOD FOR SENDING CONTENT AS CHUNKS OF DATA TO A USER DEVICE VIA A NETWORK

(71) Applicant: Comcast Cable Communications, LLC, Philadelphia, PA (US)

(72) Inventors: Michael Bevilacqua-Linn, Philadelphia, PA (US); Sean Brown, Philadelphia, PA (US); Paul Cleary, Turnersville, NJ (US); Kristofer Tomasette, Bala Cynwyd, PA (US); José Ibañez, Lafayette Hill, PA (US); Bradley Spenla, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 240 days.

(21) Appl. No.: 15/250,278

(22) Filed: Aug. 29, 2016

(65) Prior Publication Data

US 2018/0063213 A1    Mar. 1, 2018

(51) Int. Cl.
| | |
|---|---|
| *H04L 12/24* | (2006.01) |
| *H04L 29/06* | (2006.01) |
| *H04L 29/08* | (2006.01) |
| *H04N 21/2343* | (2011.01) |
| *H04N 21/2387* | (2011.01) |
| *H04N 21/258* | (2011.01) |
| *H04N 21/462* | (2011.01) |
| *H04N 21/482* | (2011.01) |

(Continued)

(52) U.S. Cl.
CPC ........ *H04L 65/602* (2013.01); *H04L 41/0654* (2013.01); *H04L 65/605* (2013.01); *H04L 65/608* (2013.01); *H04L 65/80* (2013.01); *H04L 67/02* (2013.01); *H04L 67/10* (2013.01); *H04L 67/303* (2013.01); *H04N 21/2343* (2013.01); *H04N 21/2387* (2013.01); *H04N 21/25825* (2013.01); *H04N 21/4621* (2013.01); *H04N 21/4825* (2013.01); *H04N 21/64322* (2013.01); *H04N 21/8456* (2013.01)

(58) Field of Classification Search
CPC ............. H04L 65/4076; H04L 65/4084; H04L 65/605; H04L 67/303; H04L 67/10; H04L 67/02; H04L 65/80; H04L 65/608; H04L 65/602; H04L 41/0654; H04N 19/124; H04N 21/23418; H04N 21/234309; H04N 21/23439; H04N 21/2368; H04N 21/4126; H04N 21/4345; H04N 5/765; H04N 21/8456; H04N 21/64322; H04N 21/4825; H04N 21/4621; H04N 21/25825; H04N 21/2387; H04N 21/2343
See application file for complete search history.

(56) References Cited

U.S. PATENT DOCUMENTS

| | | |
|---|---|---|
| 9,270,723 B2 | 2/2016 | Kim et al. |
| 9,313,084 B2 | 4/2016 | Reza |

(Continued)

*Primary Examiner* — Le H Luu
(74) *Attorney, Agent, or Firm* — Banner & Witcoff, Ltd.

(57) ABSTRACT

An apparatus, method and computer-readable medium are provided for sending content from a source to a user device. The content is obtained from the source by an intermediate device as a plurality of fragments and a manifest, converted into larger chunks of data, encapsulated into a single file, and then sent over a network connection to the user device.

20 Claims, 7 Drawing Sheets

(51) Int. Cl.
*H04N 21/643* (2011.01)
*H04N 21/845* (2011.01)

(56) References Cited

U.S. PATENT DOCUMENTS

| | | | | |
|---|---|---|---|---|
| 2011/0087794 | A1* | 4/2011 | Li | H04N 5/765 |
| | | | | 709/231 |
| 2013/0179588 | A1* | 7/2013 | McCarthy | H04N 21/23418 |
| | | | | 709/231 |
| 2014/0006478 | A1* | 1/2014 | Eguchi | H04L 65/605 |
| | | | | 709/203 |
| 2015/0271232 | A1* | 9/2015 | Luby | H04L 65/4084 |
| | | | | 709/231 |
| 2015/0281746 | A1* | 10/2015 | Lam | H04N 21/2368 |
| | | | | 725/116 |
| 2015/0334335 | A1* | 11/2015 | White | H04N 21/4126 |
| | | | | 348/734 |
| 2016/0182906 | A1* | 6/2016 | Panchagnula | H04N 19/124 |
| | | | | 375/240.03 |
| 2016/0191961 | A1* | 6/2016 | Fisher | H04N 21/234309 |
| | | | | 725/116 |
| 2016/0294898 | A1* | 10/2016 | Wheelock | H04L 65/4076 |
| 2016/0295298 | A1* | 10/2016 | Lee | H04N 21/23439 |
| 2017/0171287 | A1* | 6/2017 | Famaey | H04L 65/4084 |
| 2018/0007421 | A1* | 1/2018 | Yoo | H04N 21/4345 |

* cited by examiner

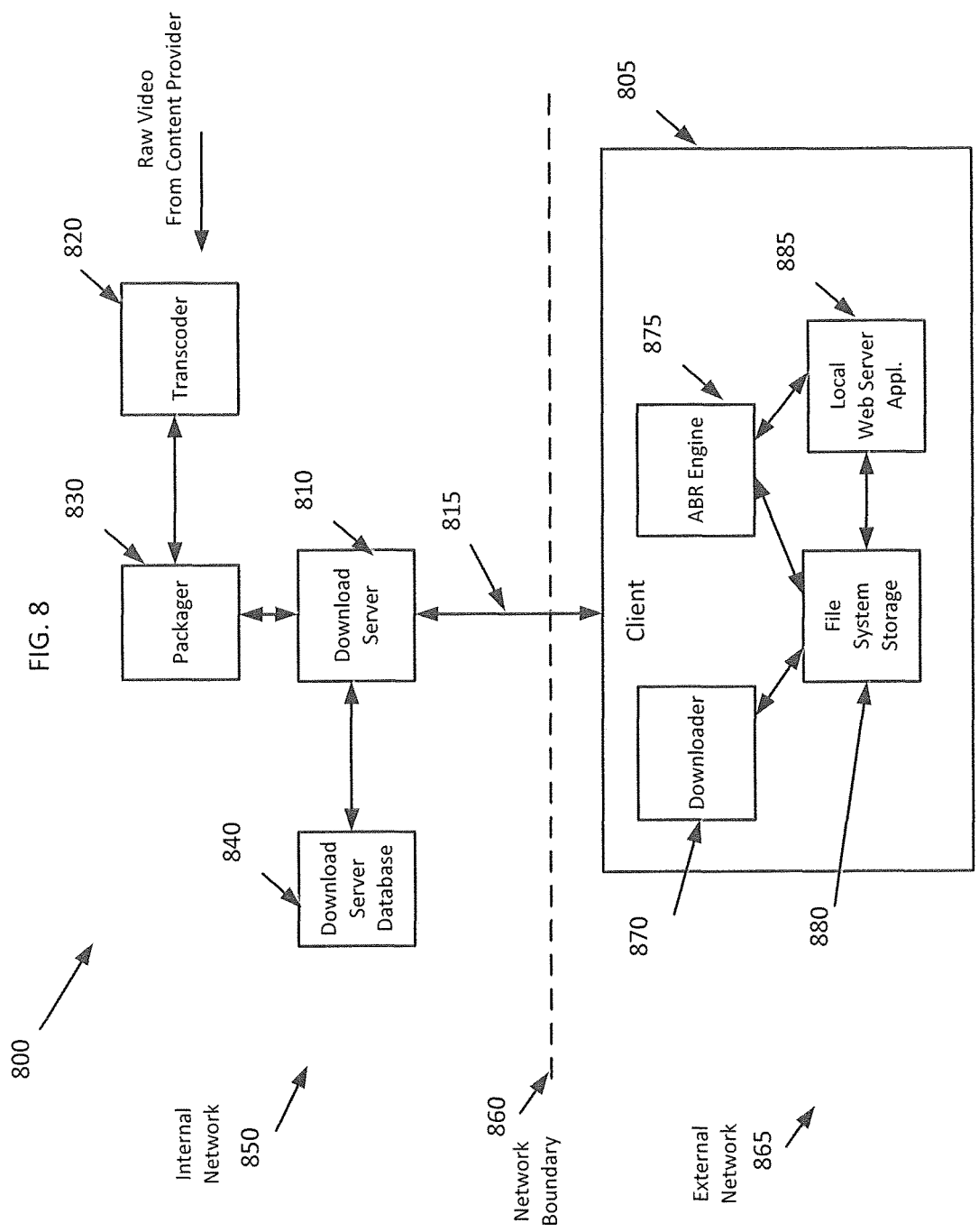

APPARATUS AND METHOD FOR SENDING CONTENT AS CHUNKS OF DATA TO A USER DEVICE VIA A NETWORK

BACKGROUND

Downloading a video for offline play by a user device can be difficult and error-prone given current digital rights management (DRM) technologies, adaptive bit rate (ABR) streaming technologies, mobile network technologies, and mobile device technologies.

As video becomes more and more complex, with higher resolution, larger images and deeper color options, the bandwidth demand placed on a content delivery network continues to increase, and there is an ever-present need for a solution that can help alleviate the bandwidth demand and deliver content in a faster way.

Also, having a user device, such as a smart phone or tablet, be able to successfully receive desired content, such as a video, over a network connection and play the desired content at a later point in time when the client is offline from the network, is an important feature as the data comprising the video get larger and larger.

SUMMARY

This summary is not intended to identify critical or essential features of the disclosure provided herein, but instead merely summarizes certain features and variations thereof.

In some illustrative embodiments, based on a request for content sent by a client device or any user device, a computing device, such as a download server, obtains a manifest file from a storage device, such as content server, that stores the content, wherein the manifest file comprises information regarding each of the files that are associated with the requested content. The computing device obtains the files listed in the manifest file from the storage device for transfer to the user device, along with the manifest file, over a network connection.

In some illustrative embodiments, content (e.g., a video) that is obtained as a plurality of fragments may be received by a computing device such as a download server in embodiments utilizing a client-server environment, and packaged into larger-sized chunks, for delivery over a network connection to a user device such as a client device in embodiments utilizing a client-server environment. The chunks are received by the user device over the network connection, converted back to a plurality of fragments, and stored at the user device for later playback of the content when the user device is offline from the network. Other embodiments may provide content from a computing device to a user device in a non-client/server environment.

In some illustrative embodiments, the delivery of the plurality of chunks from a content delivery device, such as a download server, to a user device such as a client device, may be via a chunked hypertext transfer protocol (HTTP) connection, or chunked secure hypertext transfer protocol (HTTPs) connection, or other type of network connection (e.g., TCP/IP transport connection) that allows for streaming of chunked data. For example, a file transfer protocol (FTP) connection, a real-time transport protocol (RTP) connection, or a real-time streaming protocol (RTSP) connection may be utilized as the network connectivity mechanism for sending chunked data from the content delivery device to the user device.

In some illustrative embodiments, the content delivery device keeps track of the amount of an asset that it has obtained for download by the user device based on information provided in the manifest obtained by the client delivery device from the content storage device. That way, if a network connection fails while the content is being sent from the client delivery device to the user device, the client delivery device may resume transfer of the content to the user device when the network connection returns, starting from a point in the data transfer stream when the network connection failed, based on information provided by the user device to the client delivery device regarding the amount of bytes successfully received by the user device prior to the network connection failure. For example, if the network connection failed during a time when the sixteenth chunk in a stream of chunks is being sent from the client delivery device to the user device (and thus the user device successfully received the first through fifteenth chunks over the network connection), the client delivery device may resume the sending of chunks to the user device starting with the sixteenth chunk and continuing until all of the chunks making up a video file to be sent to the user device have successfully been sent over the network connection.

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

FIG. 8 is a diagram showing a client and a download server connected to each other over a network, according to one or more aspects of this disclosure.

DETAILED DESCRIPTION

Various connections between elements are discussed and illustrated in the following description. These connections are general and, unless specified otherwise, may be for example direct or indirect, wired or wireless, and this specification is not intended to be limiting in this respect.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
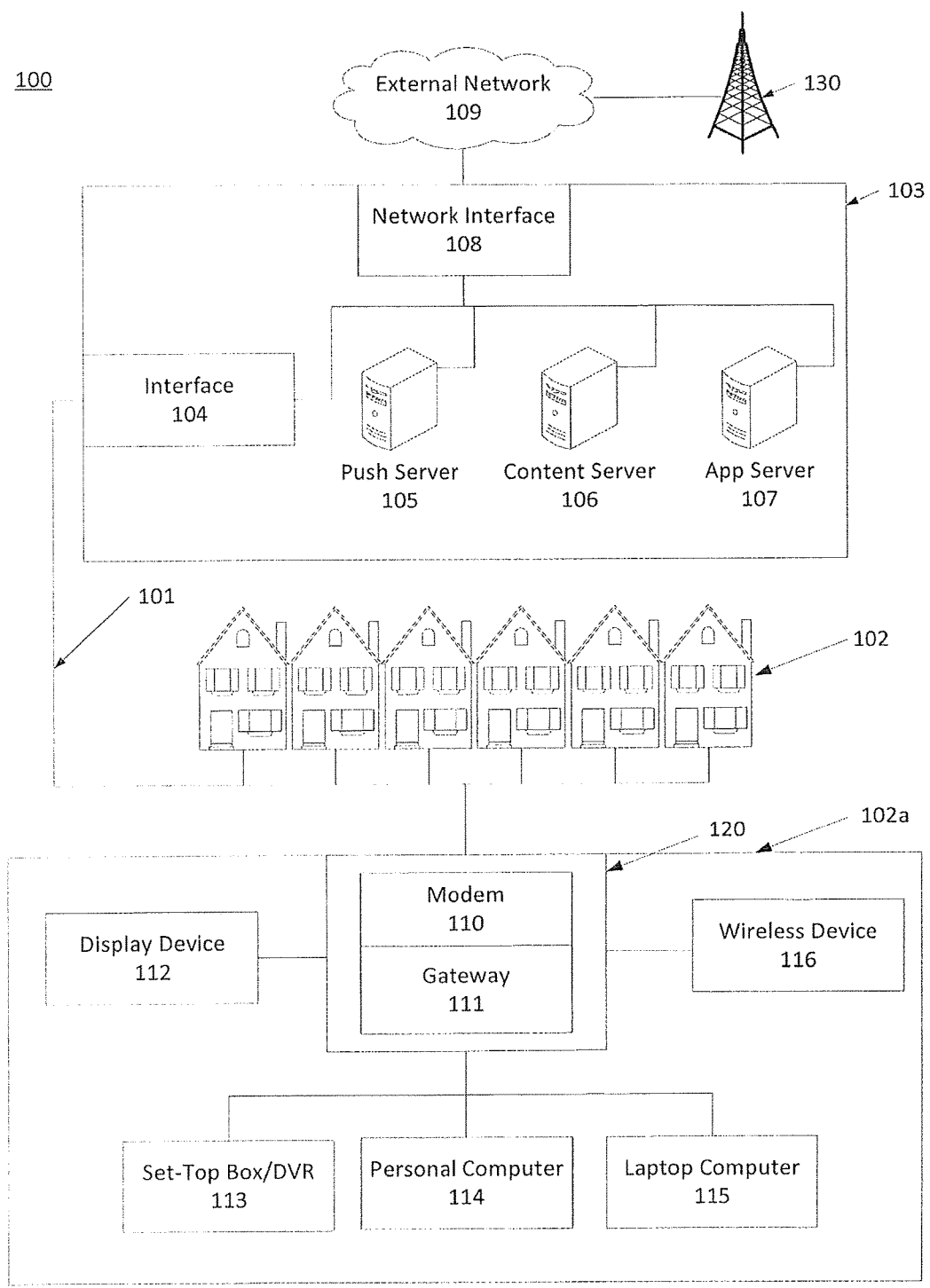
FIG. 1 illustrates an example network.

FIG. 1 illustrates an example information distribution network in which one or more of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

A network 100 may be a telecommunications network, a Multi-Service Operator (MSO) network, a cable television (CATV) network, a cellular network, a wireless network, an optical fiber network, a coaxial cable network, a Hybrid Fiber-Coaxial (HFC) network, or any other type of information distribution network or combination of networks. For example, the network 100 may be a cellular broadband network communicating with multiple communications access points, such as a wireless communications tower 130. In another example, the network 100 may be a coaxial system comprising a Cable Modem Termination System (CMTS) communicating with numerous gateway interface devices (e.g., a gateway 111 in an example home 102a). In another example, the network 100 may be a fiber-optic system comprising optical fibers extending from an Optical Line Terminal (OLT) to numerous Optical Network Terminals (ONTs) communicatively coupled with various gateway interface devices. In another example, the network 100 may be a Digital Subscriber Line (DSL) system that includes a local office 103 communicating with numerous gateway interface devices. In another example, the network 100 may be an HFC network in which Internet traffic is routed over both optical and coaxial communication paths to a gateway interface device in or near a user's home. Various aspects of the disclosure may operate on one or more of the networks described herein, or any other network architectures now known or later developed.

The network 100 may use a series of interconnected communication links 101 (e.g., coaxial cables, optical fibers, wireless links, etc.) to connect a premises 102 (e.g., a home or other user environment) to the local office 103. The communication links 101 may include any wired communication links, wireless communication links, communications networks, or combinations thereof. For example, portions of the communication links 101 may be implemented with fiber-optic cable, while other portions of the communication links 101 may be implemented with coaxial cable. The communication links 101 may also include various communications components such as splitters, filters, amplifiers, wireless components, switches, routers, and/or other components for communicating data.

The local office 103 may include an interface 104, which may be a computing device configured to manage communications between devices on the network of the communication links 101 and backend devices, such as a server. For example, the interface 104 may be a CMTS. The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in the premises 102, and to receive upstream communications from those modems on one or more upstream frequencies.

The local office 103 may include one or more network interfaces 108 for communicating with one or more external networks 109. The local office 103 may include a variety of servers that may be configured to perform various functions. The local office 103 may include a push server 105 for generating push notifications to deliver data, instructions, or both to devices that are configured to detect such notifications. The local office 103 may include a content server 106 configured to provide content (e.g., media content) to devices. The local office 103 may also include an application server 107.

The gateway 111 may be any computing device for communicating with the modem 110 to allow one or more other devices in the example home 102a to communicate with the local office 103, the one or more external networks 109, and/or other devices communicatively coupled thereto. The gateway 111 may include local network interfaces to provide communication signals to client devices in or near the example home 102a, such as a television 112, a set-top box 113, a personal computer 114, a laptop computer 115, a wireless device 116 (e.g., a wireless laptop, a tablet computer, a mobile phone, a portable gaming device a vehicular computing system, a mobile computing system, a navigation system, an entertainment system in an automobile, marine vessel, aircraft, etc.), or any other device. In some instances, the gateway 111 may be a wireless router and/or hotspot, which may be configured to provide service to one household and/or other users.

Figure 2:
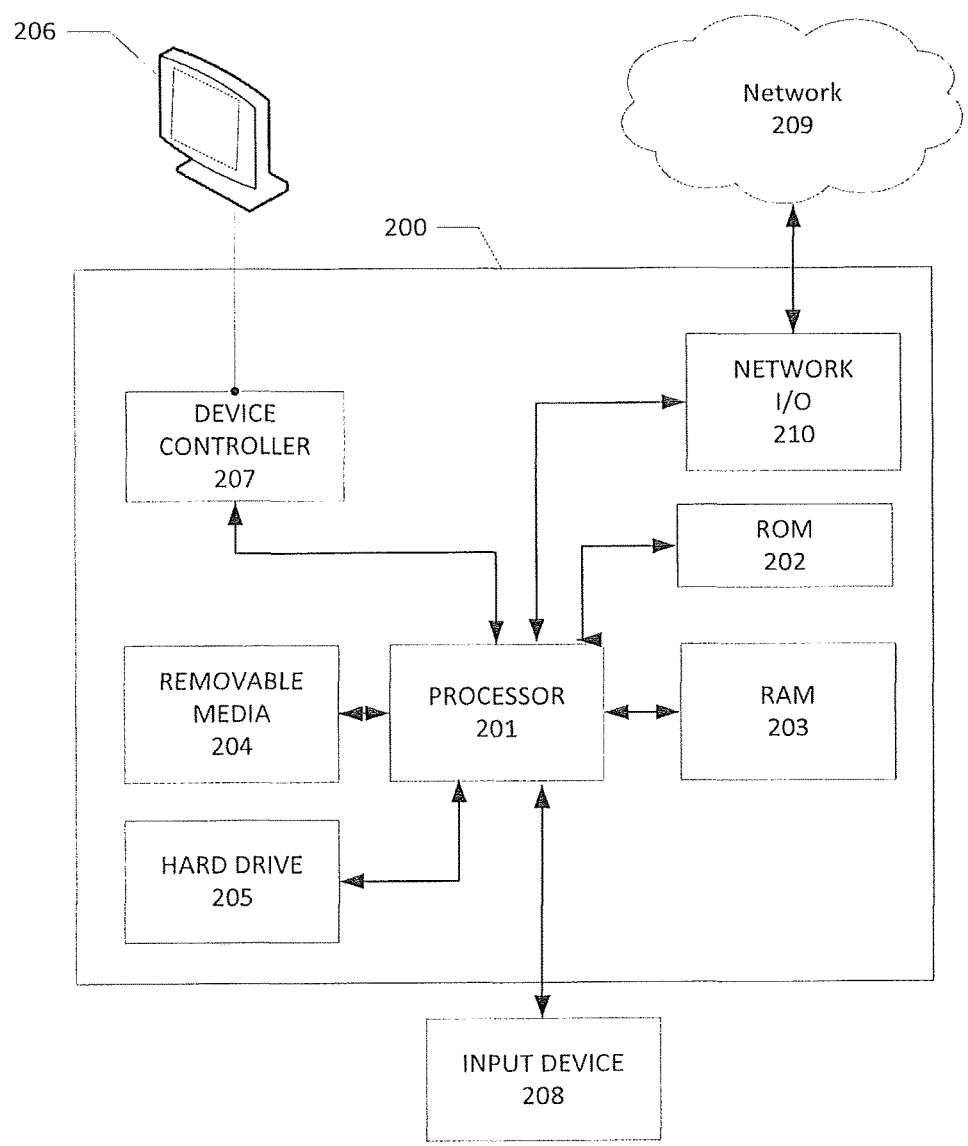
FIG. 2 illustrates an example computing device on which the various elements described herein may be implemented.

FIG. 2 illustrates general hardware elements that may be used to implement any of the various computing devices, servers, encoders, caches, and/or software discussed herein. A device 200 may include a processor 201, which may execute instructions of a computer program to perform any of the functions and steps described herein. The instructions may be stored in any type of computer-readable medium or memory to configure the operation of the processor 201. For example, instructions may be stored in a Read-Only Memory (ROM) 202, a Random Access Memory (RAM) 203, a removable media 204, such as a Universal Serial Bus (USB) drive, Compact Disk (CD) or Digital Versatile Disk (DVD), hard drive, and/or any other desired electronic storage medium. Instructions may also be stored in a hard drive 205, which may be an internal or external hard drive.

The device 200 may include one or more output devices, such as a display 206 (e.g., an integrated or external display, monitor, and/or television), and may include a device controller 207, such as a video processor. In some embodiments, the device 200 may include an input device 208, such as a remote control, keyboard, mouse, touch screen, microphone, motion sensing input device, and/or any other input device.

The device 200 may also include one or more network interfaces, such as a network Input/Output (I/O) interface 210 to communicate with a network 209. The network interface may be a wired interface, wireless interface, or a combination of the two. In some embodiments, the network I/O interface 210 may include a cable modem, and the network 209 may include the communication links 101 shown in FIG. 1; the one or more external networks 109; an in-home network; a provider's wireless, coaxial, fiber, or hybrid fiber/coaxial distribution system (e.g., a DOCSIS network); and/or any other desired network.

Aspects of this disclosure may be implemented to provide one or more models of content delivery, such as audio, video and data (e.g., closed captioning, alerts, etc.) delivery. In some embodiments, a single model of content delivery may be used, potentially irrespective of the type of content that is being delivered. In some embodiments, video codecs, protocols, and control plane flows may be provided on a constant or consistent basis. In some embodiments, various features (e.g., Start Over and Digital Video Recording (e.g., network DVR)) may be provided. For purposes of illustrative simplicity and consistency, the delivered content asset is described as comprising video. The techniques described herein may be adapted and applied to other forms or types of content delivery, such as a delivery of text files, audio (e.g., music, voice), pictures/images, emails, instant messages, etc.

Wireless device 117, wireless device 116, personal computer 114, or laptop computer 115 may perform one or more processes described herein. Wireless device 117, wireless device 116, personal computer 114, or laptop computer 115 may perform these processes in response to processor 201 executing software instructions stored by a non-transitory computer-readable medium, which may comprise a ROM 202, a RAM 203, a Removable Media 204, or a Hard Drive 205. A memory device includes memory space within a single physical storage device or memory space spread across multiple physical storage devices.

Software instructions may be read into ROM 202, RAM 203, Removable Media 204, or Hard Drive 205 from another computer-readable medium or from another device via information received by processor 201 from Network I/O 210. When executed, software instructions stored in ROM 202, RAM 203, Removable Media 204, or Hard Drive 205 may cause processor 201 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, computing device 200 may include additional components, fewer components, different components, or differently arranged components than those shown in FIG. 2. Additionally, or alternatively, a set of components (e.g., one or more components) of computing device 200 may perform one or more functions described as being performed by another set of components of computing device 200.

Figure 3:
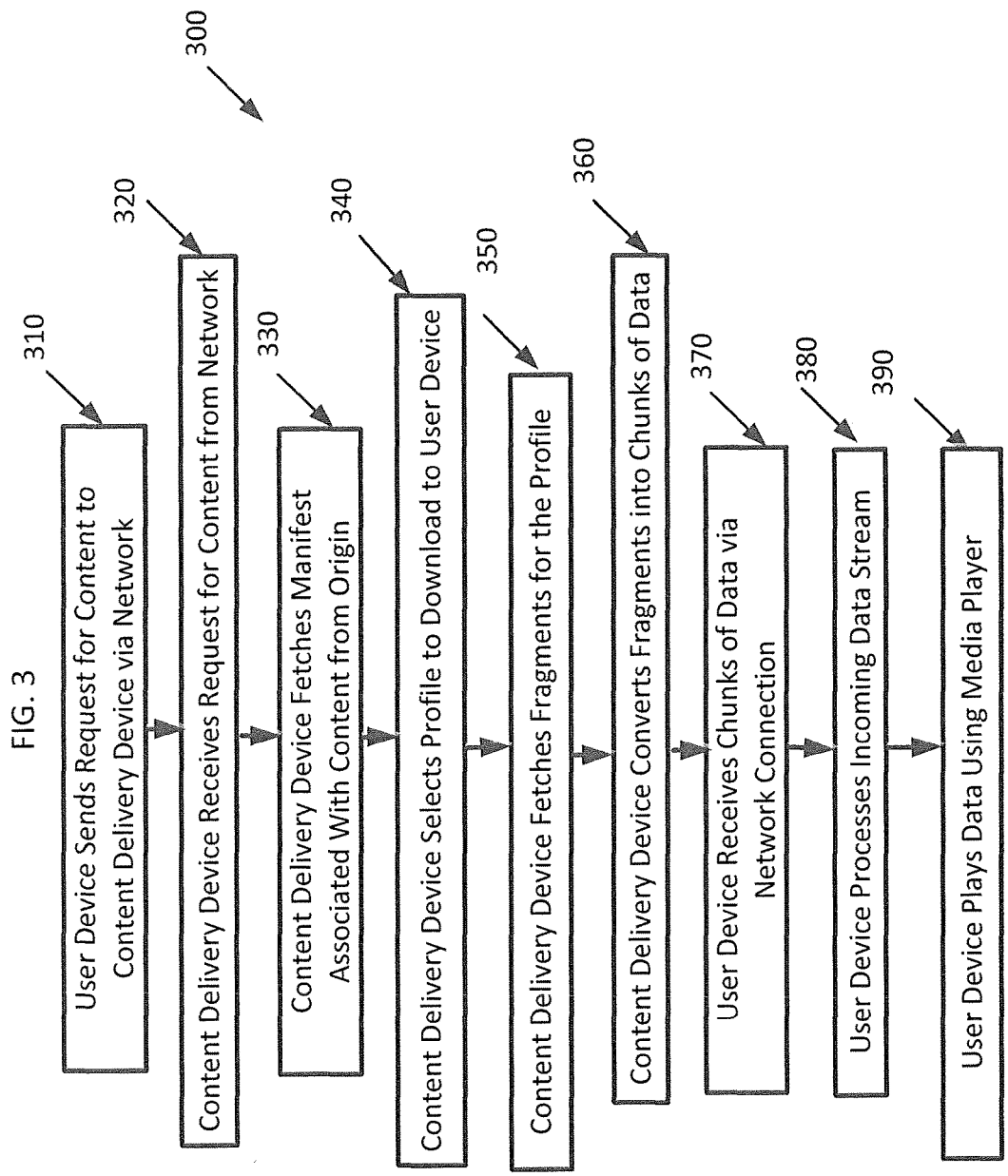
FIG. 3 is a flow chart of a process for providing video data to a user device for later playback or for playback in real time by the user device, according to one or more aspects of this disclosure.

FIG. 3 is a flow chart of an example process 300 for obtaining a video file for later offline play by a user device, such as wireless device 117, wireless device 116, personal computer 114, or laptop computer 115, according to one or more aspects of the disclosure. In some embodiments, the various blocks shown in FIG. 3 may be included in, associated with, or executed in accordance with one or more of the components, devices, or environments described above in connection with FIGS. 1, 2 and 4-8. For example, referring to FIG. 1, a content delivery device such as a download server in a client-server environment may correspond to application server 107 or content server 106, and the network may correspond to network 109 or the cable lines 101 providing network connectivity between central office 103 and premises 102a. Examples are provided below for a client-server environment, whereby a user device other than a client device may receive content from a content delivery device other than a download server in some embodiments.

Referring back to FIG. 3, in a step 310, a user device, such as a client device, may make a request for content, such as content comprising video data and/or audio data, application or game data, etc., to a computing device such as a download server or other type of content delivery device, over a network. By way of example, the requested content may comprise a request for video for playback by the user device, or an associated display device, when the user device is off line. The request for content may be sent by the user device after the user device is made aware of new content, such as a new movie available for download, and may comprise in some embodiments an HTTP HEAD request sent by the user device to the content delivery device. Internet protocols and transmission techniques other than HTTP may be utilized in other embodiments, such as, e.g., TCP/IP, FTP, UDP, RTP, and tunneling transmission techniques and protocols. In some embodiments, the request for content may be sent from the user device directly to a content storage device, which then determines whether it currently stores the asset desired by the user device. In other embodiments, the request for content may be sent from the user device to a content delivery device comprising a download server (e.g., application server 107 in FIG. 1 or another computing device configured to access and transfer files), and then the download server may query a content storage device (e.g., content server 106 in FIG. 1, a CDN, etc.) for content requested by the user device. The request for content sent by the user device may comprise one or more selection parameters, such as screen resolution information, screen size information, bit rate information, and quality of service (QoS) information, which may be sent separate from the request for content or as part of the request for content.

In a step 320, the client delivery device may receive the request for content from the network (e.g., the application server 107 receiving a request for content via the network interface 108 or via TS 104 as shown in FIG. 1). Based on information provided in the request for content, the client delivery device may tailor or otherwise modify the content to be sent to the user device so that the content contains the appropriate video profile associated with the user device, to thereby enable the user device to process the downloaded content and display the content in an appropriate manner for the user device. For example, based on the selection parameters, the tailored or otherwise modified content delivered to the user device may be suited for a particular screen resolution and screen size of the user device, such as a user device corresponding to a smart phone having a 4.7 inch diagonal screen size, and may be provided at a suitable bit rate for appropriate display of the content by the user device.

In a step 330, the client delivery device may fetch a manifest associated with the content to be downloaded to the user device from an origin where the content is stored. For example, referring now to FIG. 1, the application server 107 may fetch the manifest from the content server 106 based on a request for manifest information regarding a particular video stored as one or more files by the content server 106. The manifest may be arranged as a file or data structure containing metadata for a group of accompanying files that are part of a set or coherent unit, such as the files constituting a video desired by a user for display by the user device. The manifest may relate to one or more assets, such as one or more content assets or one or more associated videos. For example, the manifest may correspond to an ordered set of fragments that are obtained by the application server 107 from the content server 106, for playback of a video corresponding to the ordered set of fragments from beginning to end by a media player application of the user device.

One or more fragments may correspond to one or more portions of the video, such as one or more scenes of a movie.

In the context of an audio asset (e.g., music), a fragment may correspond to one or more portions of a recording, such as the chorus of a particular song. A playlist may be used to play back the fragments in the proper order for play back of a song or a video, whereby the playlist may be created from the manifest by a media player application on the user device.

In a step 340, the content delivery device may select a profile to download to the user device based on the selection parameters previously sent from the user device to the content delivery device in step 310. The profile may comprise a particular resolution of video data for display by the user device, and/or an aspect ratio of the video data to be displayed (e.g. 16:9 height-to-width ratio). In some embodiments, the content delivery device may store a plurality of profiles, and choose one of the profiles to match the selection parameters received from the user device. By way of example and not by way of limitation, the content delivery device may choose either a first profile providing for 25 Mbit/sec bit rate for playing of a video on large 1080p television screen, or a second profile providing for 800 kbit/sec bit rate for playing of a video on a smart phone. Based on which profile is chosen, the content delivery device may obtain the requisite fragments associated with that profile from a content storage device such as a content server (e.g., a set of fragments to play a video at a 25 Mbit/sec bit rate, or a set of fragments to play video at a 50 Mbit/sec bit rate).

In some embodiments, the content delivery device may notify the user device as to the estimated size of the content to be downloaded to the user device based on the profile that is selected in accordance with the selection parameters provided by the user device. If the estimated size of the content is more than the available memory space for storage of the content at the user device, the user device may cancel the request. Alternatively, the user device may choose to notify the content delivery device that it will accept the content at a lesser resolution using a different profile as would normally be used for the specific type of user device, but which allows the user device to store the content in the available memory space of the user device.

Referring now to FIG. 1 and FIG. 3, in a step 350, the content delivery device may start to fetch fragments for the profile, which may correspond in some embodiments to the application server 107 fetching video data from the content server 106 for transfer to the wireless device 117, the wireless device 116, the personal computer 114, or the laptop computer 115. By way of example, in the context of a video asset (e.g., movie), a fragment may correspond to a portion of a movie, such as one short two second scene of a movie. The fragments may be selected based on the profile of the user device, for playback of the content at a particular bit rate and resolution by the user device. For example, one profile may be chosen for an IPhone 6S user device and another profile may be chosen for a Tablet Computer having a better resolution capability and a larger screen that the IPhone 6S. The fragments may be received by the application server 107 from the content server 106 as fragmented MP3 or MP4 video data, or as AVI data, or as GIF data, or other type of video data in compressed or uncompressed form.

In a step 360, the content delivery device may convert the fragments obtained from the origin into chunks of data. In some embodiments, this may involve the content delivery device combining the fragments received from the origin into larger chunks of data, for sending to the user device over a network connection, such as part of a single network connection comprising a chunked hypertext transfer protocol (HTTP) connection over the network. By way of example and not by way of limitation, the chunked HTTP connection may comprise chunked transfer encoding, which is a data transfer mechanism in HTTP version 1.1 in which data is sent in a series of chunks over the HTTP connection and in which a transfer-encoding header is used in place of a content-length header. Because the content-length header is not used in the HTTP connection in the chunked data transfer, the sender of data (the content delivery device) does not need to know the length of the content before it starts transmitting a response to the receiver of the data (the user device). Thus, by using a chunked data transfer, the content delivery device may begin transmitting dynamically-generated content before receiving, from a content storage device such as a content server, all of the content to be sent to the user device over the network. In some embodiments, the content delivery device forms a single zip archive file comprising the chunks of data, which is sent to the user device over the HTTP connection.

In some embodiments, the first chunk to be sent over the network connection to the user device may comprise a manifest file and video data corresponding to a beginning portion of a video requested by the user device. In other embodiments, the first chunk may just comprise the manifest file, whereby the actual encoded video data is streamed in the second and successive chunks sent via the HTTP connection from the content delivery device to the user device. Each of second and successive chunks sent after the first chunk via the HTTP connection may comprise a small-to-medium sized video segment (e.g., between 2 seconds to 5 minutes of video) along with associated audio and other data (e.g., closed captioned information).

Chunked data transfer enables the content delivery device to maintain an HTTP persistent connection with the user device for transferring dynamically generated content to the user device. That is, when the user device sends a single request for a video to the content delivery device in step 310, an HTTP connection is established between the user device and the content delivery device on the network and remains established while a plurality of chunks corresponding to the entire video are sent one at a time over the HTTP connection from the content delivery device to the user device. Once the last chunk is sent to the user device (which may be determined in some embodiments by the last chunk having a chunk value of zero), the user device may then send out a command to the content delivery device to tear down the HTTP connection. Alternatively, the content delivery device may send out a command to tear down the HTTP connection after having sent out the last chunk to the user device.

The sending of a single request for video by the user device allows for efficient transfer of video data from the content delivery device to the user device via a chunked http connection when an application on the user device is operating in the background and thus may have limited access to resources (antenna, processor) of the user device. For example, an application running in the background may only be provided with 1% of the processor capability and 1% of the antenna bandwidth. Based on the single request for content made by the user device to the content delivery device according to one or more embodiments, the content delivery device obtains and packages the fragments comprising the video as obtained from a content storage device into a plurality of chunks, which may then be encapsulated and sent as a single file (e.g., zip archive file) to the user device. This improves over a conventional content obtaining approach in which a request for video comprising many thousands of fragments causes an application on the user device to make a separate request for each fragment, whereby the content delivery device has to acknowledge each of the requests for fragments. This results in a time consuming and unpredictable download process due to opening and closing of a reception window for each fragment to be obtained by the user device from the content delivery device for each separate fragment requested by the user device based on the manifest obtained by the user device that designates each of the fragments corresponding to the requested content. Furthermore, the queuing up of each file obtained by the user device corresponding to each fragment obtained from the content delivery device in a conventional content obtaining approach requires much complexity and system resources of the user device, making such a process of obtaining content unwieldly and prone to error.

Chunked data transfer as utilized in one or more embodiments has the benefit that it is not necessary for the content delivery device to generate the full content of a data file before starting to send a portion of the data file as one or more chunks to the user device, and that the chunks of data may be sent to the user device as a continuous stream of data based on a single request for content sent by the user device to the content delivery device. Chunked data transfer allows for streaming of content in an HTTP connection comprising a series of consecutive chunks and allows for explicitly signaling the end of the content by the sending of a 'zero data chunk,' thereby making the HTTP connection available for a succeeding HTTP request/response. Chunked data transfer also allows the content delivery device to send additional header fields after the message body (e.g., after the sending a particular chunk of video data in the 'body' of the chunk), if desired. Also, the sending of chunks of data as a continuous stream of data over a chunked HTTP connection enables the user device to receive the chunks of data as a single compressed data file, such as a zip archive file. The user device may then readily unzip the zip archive file to obtain the plural fragments making up the zip archive file, for playback by an ABR media player of the user device at a later time when the user device is offline from the network.

A zip archive file may store multiple files, and encapsulates (which may also involve compressing of the data in some implementations) the multiple files into a single file from the point of view of the recipient of the zip archive file. A directory may be placed at the end of the zip archive file, and may be used to identify what files are in the zip archive file and where those files are located in the zip archive file. As such, when the zip archive file is unzipped by the user device, the information in the directory of the zip archive file may be used to separate and store each of the thousands of fragments (e.g., files) making up the zip archive file.

With respect to the processing of the video data to be sent by the content delivery device to the user device over a network such as the Internet, WAN, LAN or other type of network, according to some embodiments this may be performed by two-stage encoding of a content stream sent via the HTTP connection from the download server to the user device. In the first encoding stage, the content stream (i.e., the fragments comprising the video data) is encoded as a compressed data stream by a content encoder, and in the second encoding stage, the resulting compressed data stream is encoded for transfer by a transfer encoder that performs the chunking of the compressed data stream. The size of each chunk sent within a stream of data over the network may be sent in a header portion of a chunk before the sending of video and/or audio data within each chunk, as described above, so that the user device may readily determine when it has finished receiving data for each chunk sent over the HTTP connection. According to some embodiments, the data transfer between the content delivery device and the user device may be terminated by a final chunk of zero length.

According to some embodiments, the user device may track of the amount of bytes that it received from the server over a network connection, and, in the event of a network connection failure, the user device may inform the content delivery device as to the amount of bytes that it successfully received prior to the network connection failure. Based on the number of bytes successfully received by the user device, the content delivery device may determine which one of a plurality of chunks of data was being sent to the user device over a network connection when the network failure occurred. The content delivery device may then resend that one chunk of data and succeeding chunks of data to the user device over the restored network connection to complete the sending of the content requested by the user device. The content delivery device does not send any chunks that were sent to the user device prior to the network failure, thereby saving on network resources.

Because the content delivery device may dynamically create the chunks of data to be sent over a chunked network connection to the user device, the content delivery device may keep track of which fragments are provided in each chunk. Then, if a network connection problem occurs during the transfer of chunks from the content delivery device to the user device, the user device may notify the content delivery device of the problem and the amount of data successfully received by the user device up to the point in time when the network connection problem occurred. The content delivery device then may access a table stored at or otherwise accessible by the content delivery device (see, for example, database 840 in FIG. 8) that maps each chunk to the number of bytes to be sent to the user device over the network connection. For example, the table may comprise information that Chunk #1 corresponds to Byte 1 to Byte 1,550,000 sent over the network connection to the client, Chunk #2 corresponds to Byte 1,550,001 to Byte 3,355,036 sent over the network connection to the user device, Chunk #3 corresponds to Byte 3,555,037 to Byte 7,333,328 sent over the network connection to the user device, etc. Based on the information stored in the table, the content delivery device may determine a percentage amount of the content that has been sent to the user device while the HTTP connection is being utilized to send the content to the user device. Continuing with this example, when the content delivery device is notified by the user device that a network connection problem occurred when the user device was receiving Byte 3,200,318, the content delivery device may then resend Chunk #2 (e.g., Byte 1,550,001 to Byte 3,355,036) and succeeding chunks over the network connection when the network connection problem is resolved.

In a step 370, the user device may receive an incoming data stream comprising the chunked data received over the chunked network connection from the content delivery device, via the chunked HTTP connection set up between the content delivery device and the user device. Each chunk may be separately sized by the content delivery device to include plural fragments, whereby each chunk may include header information setting forth the size of the corresponding chunk. For example, Chunk #1 may be 15.5 kbytes in size and comprises 122 separate fragments, Chunk #2 may be 27.3 kbytes in size and comprises 183 fragments, Chunk #3 may be 8.3 kbytes in size and comprises 57 separate fragments, etc.

In a step 380, the user device may process the incoming data stream for playback by the user device. The incoming data stream comprising compressed chunked data received over the network connection appears to the user device as a single encapsulated file, such as a zip archive file, an RAR file, a Tar file, or a 7z file, and not as a plurality of separate fragments that actually make up the single encapsulated file. For example, similar to a way that an archive zip file application is used to combine many separate files into a single zip archive file, the thousands of fragments sent over the chunked network connection may be combined into a single zip archive file. Each of the fragments may correspond to a separate "file" being packaged into the single zip archive file, which may then be unzipped by the user device to obtain the plural files or fragments making up the single zip archive file. The incoming data stream includes the manifest file, which may be provided in the first chunk in some embodiments, and which may include information regarding each of the fragments comprising the content requested by the user device, and the particular order of playback of the fragments by a media player application of the user device.

In some embodiments, the chunked data received over the network connection by the user device may be subject to a decompression algorithm or unencapsulation algorithm by the user device to obtain the fragments making up each of the chunks, and then the fragments may be stored in memory of the user device (see, for example, file system storage 880 in FIG. 8). This may result in use of more memory space to store the fragments than if the chunked data obtained over the network connection is stored directly to the memory of the user device without decompressing the chunked data back into fragments. However, in the latter case, the chunked data would then be decompressed to obtain the fragments, for offline playback by an ABR engine of the user device at a later point in time. The storage unit for storing the incoming data stream may comprise the RAM 203 and/or the Removable Media 204 and/or the Hard Drive 205 shown in FIG. 2.

In a step 390, a media player or the like at the user device, such as an ABR media player (see, for example, ABR engine 875 in FIG. 8) under control of the processor 201 shown in FIG. 2, may play the unzipped data for display of a movie corresponding to the downloaded content by the user device at any later point in time, such as when the user device is offline from the network, or for presentation and playing in real time as streaming video. In some embodiments in which the data received over the network connection is stored in zip archive file format (e.g., as an encapsulated file), upon receiving a request for offline playback of a video, a local web server application of the user device may obtain the zip archive file stored in a file storage of the user device, unzip the zip file to obtain the manifest and the fragments associated with a video, and forward the fragments to an ABR engine of the user device for playback of the video. In some embodiments in which the data received over the network connection is stored in unzipped format as a plurality of fragments, the local web server application may retrieve the manifest and then provide the fragments associated with a video to a standard media player application of the user device, for playing of the video by the user device. The manifest may be provided in the first chunk received over the network connection in some embodiments, or in another chunk such as the second chunk in other embodiments, and may include information regarding each of the fragments comprising the content requested by the user device, and the particular order of playback of the fragments by the ABR media player of the user device.

In some embodiments, the local web server application may function for offline playback of a video in the same manner as would be done for playing a live streaming video, but whereby the local web server application may obtain the content for offline playback of video from an internal memory of the user device and not from an external location such as a network server accessed over a WAN or LAN as would be the case for accessing the live streaming video content.

Figure 4:
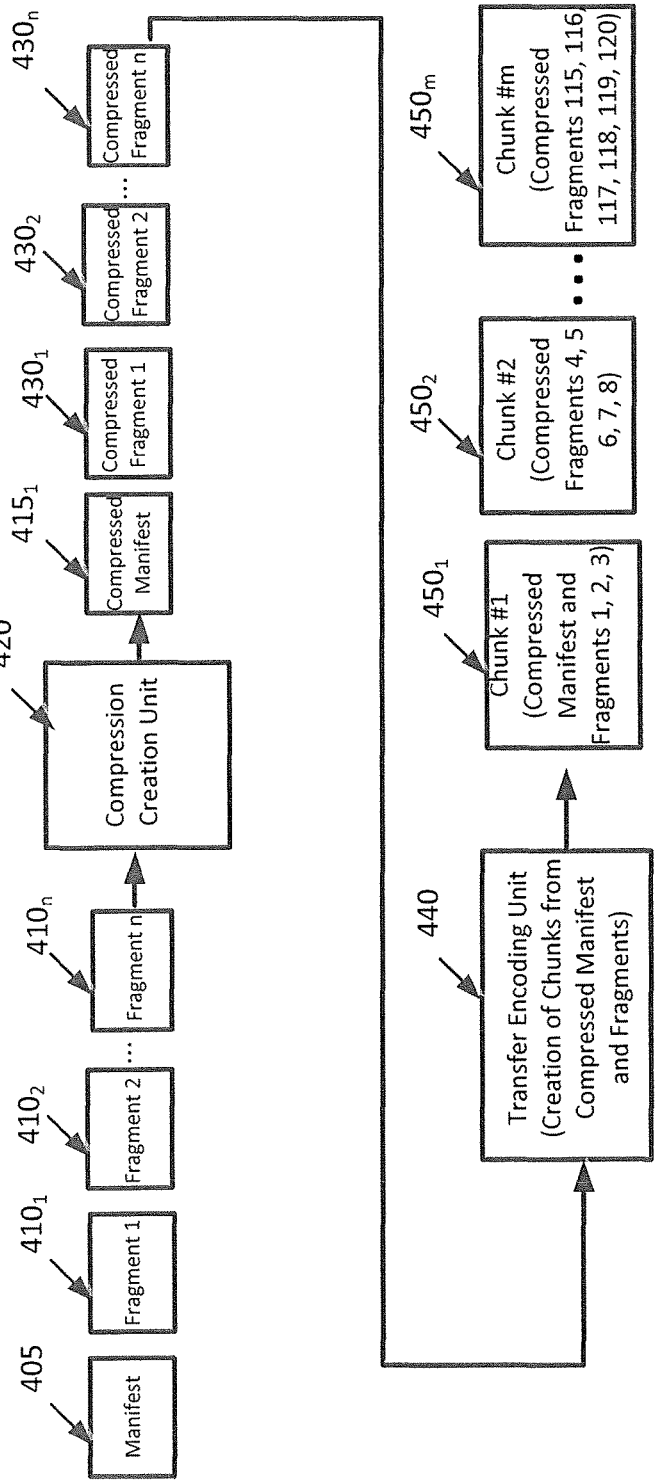
FIG. 4 is a diagram showing the conversion of fragments into chunks, to be send over a network connection from a content delivery device to a user device, according to one or more aspects of this disclosure.

FIG. 4 shows in block diagram form elements of a content delivery device that create chunks from a manifest and fragments, according to one or more embodiments. The content delivery device receives a manifest 405 and fragments $410_1, 410_2, \ldots 410_n$ from a content storage device based a request for video data that is stored at the storage device. A compression creation unit 420 compresses the manifest 405 and the fragments $410_1, 410_2, \ldots 410_n$ to obtain a compressed manifest $415_1$ and compressed fragments $430_1, 430_2, \ldots 430_n$. The compressed manifest $415_1$ and compressed fragments $430_1, 430_2, \ldots 430_n$ are input to a transfer encoding unit 440, which creates chunks $450_1, 450_2, \ldots 450_m$ from the compressed manifest $415_1$ and the compressed fragments $430_1, 430_2, \ldots 430_n$, whereby m and n are positive integers in which m<n.

Figure 5:
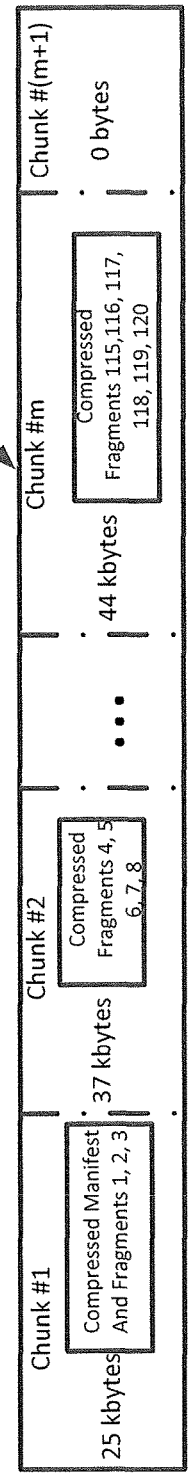
FIG. 5 is a diagram showing chunks of data sent from a client delivery device to a user device, according to one or more aspects of this disclosure.

FIG. 5 shows a stream of chunked data 500, sent over an HTTP connection, for example, established between a content delivery device and a user device over a network, according to some embodiments. The stream of chunked data 500 comprises m chunks containing some amount of video data (i.e., compressed fragments), plus an $(m+1)^{st}$ chunk containing no data. Each chunk may comprise a header portion that includes information signifying the particular size of that chunk, in which the first chunk (chunk #1) has a header with a value equal to 25 kbytes signifying the amount of compressed fragment data stored in a data portion of the first chunk, and in which the $(m+1)^{st}$ chunk has a header with a value equal to "zero" (0) signifying no compressed fragment data stored in the data portion of the $(m+1)^{st}$ chunk. Reception of the "zero data" $(m+1)^{st}$ chunk by the user device provides a notification to the user device that there are no more chunks of data to be sent over the HTTP connection, whereby the user device may drop the HTTP connection at this point in time. In some embodiments, the first chunk may include a manifest file and one or more fragments of the content for playback by the user device using the manifest file for playback of the fragments in a particular sequential order. In other embodiments, the manifest file is included in a predetermined chunk (e.g., second chunk, or fifth chunk) of the stream of chunked data sent to the user device, so that the user device may then discriminate and thereby separate the manifest file from the fragments comprising the requested video in the received data stream.

As shown in FIG. 5, each chunk comprises a plurality of separate fragments, whereby each chunk may be of a different size than or a same size as the other chunks in the stream of chunked data 500. That way, based on the rate at which the fragments are being obtained by the content delivery device from the content storage device, the stream of data sent over the chunked network connection from the content delivery device to the user device can be maintained in a continuous manner without stopping the transfer of data. For example, during times when fragments of a desired video are slowly received by the content delivery device from the content storage device due to other requests for fragments of the desired video (or for other videos stored at the content server) being handled at the same time by the content storage device, the content delivery device may send out smaller-sized chunks comprising lesser number of fragments-per-chunk as compared to previous chunks sent over a chunked network connection between the content delivery device and the user device. Then, when the content storage device starts to send fragments of the desired video more quickly, the content delivery device may send out larger-sized chunks comprising a larger number of fragments-per-chunk over the same chunked network connection between the content delivery device and the user device.

Chunked data transfer is a data transfer mechanism utilized in network communications such as HTTP Version 1.1, in which data is sent in a series of chunks, whereby the sender (e.g., the download server in some embodiments) does not need to know the length of the content before it starts transmitting a portion of the content to a receiver (e.g., the client device in some embodiments). The size of each chunk may be sent right before or right after the chunk itself, so that the receiver can tell when it has finished receiving data for that chunk. In this case, the size of each chunk is based on the number of fragments included in each chunk.

Figure 6:
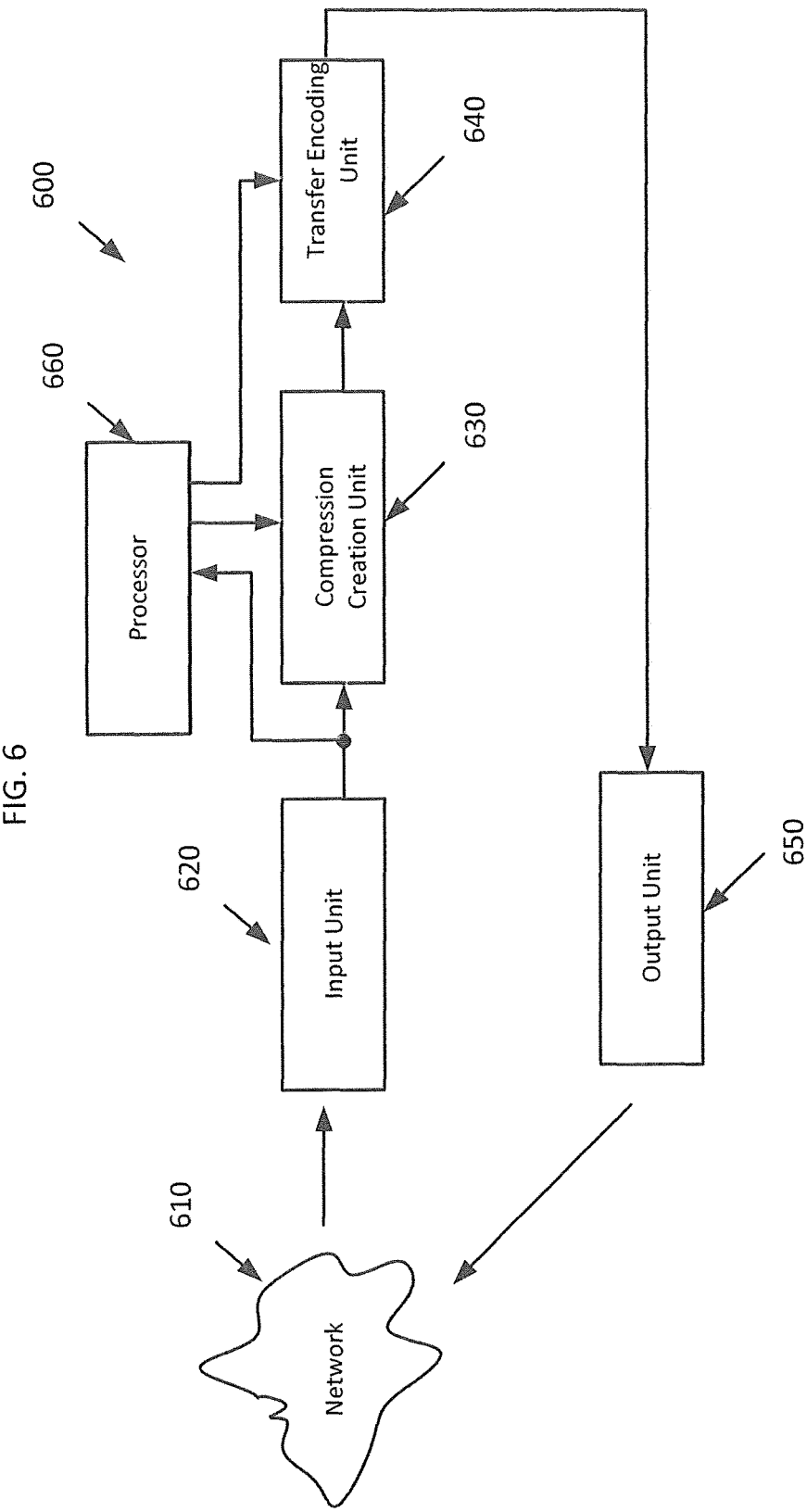
FIG. 6 is a block diagram of elements making up a content delivery device according to one or more aspects of this disclosure.

FIG. 6 shows in block diagram form a content delivery device 600 configured to send content corresponding to a video desired by a user of a user device over a network 610, such as the Internet, a LAN or a WAN, or any other type of network, according to some embodiments. The content delivery device 600 is a computing device that may comprise an input unit 620 that receives content from a content storage device (not shown) to be sent to the user device over the network 610, as a plurality of data fragments. The content delivery device 600 also may comprise a compression creation unit 630 that converts the plurality of data fragments into a plurality of compressed data fragments. The content delivery device 600 further may comprise a transfer encoding unit 640 that creates a plurality of chunks of data from the plurality of compressed data fragments, in which each of the plurality of chunks of data may comprise more than one of the compressed data fragments. The content delivery device 600 may still further comprise an output unit 650 that sends the chunks of data over the network 610 to the user device via a network connection. The chunks of data are capable of being converted back into data fragments for playback of the content as a video data file by the user device. A processor 660 may control operations of the compression creation unit 630 and the transfer encoding unit 640 based on the content received by the input unit 620.

Figure 7:
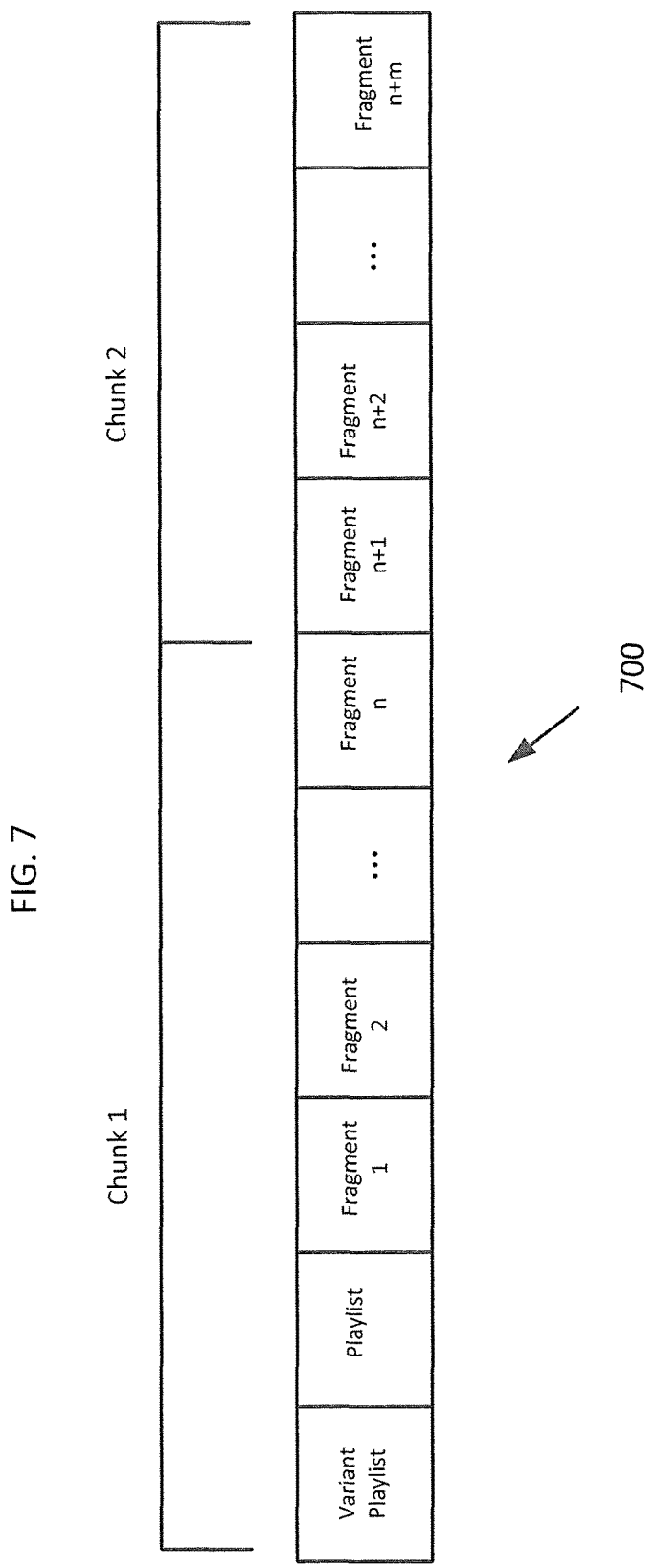
FIG. 7 is a diagram showing a file structure of plural chunks of data sent over a network connection and what constitutes each chunk of data, according to one or more aspects of this disclosure.

FIG. 7 shows a file structure 700 that may be used for sending desired content to a user device from a content delivery device, according to one or more embodiments. A plurality of fragments 1, 2, . . . n+m (n and m each being positive integers greater than one) comprising the desired content, such as a video file, are placed into separate chunks by the content delivery device, and are sent to the user device as a plurality of consecutive chunks (Chunk 1, Chunk 2, . . . ) over a network connection. The first chunk, Chunk 1, may comprise the manifest of the files associated with a desired video. The manifest may comprise one or more Variant Playlists (i.e., playlists associated with multiple bit rate streams) and a Master Playlist. Chunk 1 may also comprise one or more fragments comprising encoded video data. The second chunk, Chunk 2, and succeeding chunks (not shown in FIG. 7) each comprise a plurality of fragments making up the remainder of the video file requested by the user device. The fragments may be compressed or otherwise encapsulated prior to inclusion in the chunks in some embodiments, such as by using a zip application or a file compression application by the download server (or by a packager that provides packaged data to the content delivery device, as seen in FIG. 8). Upon receiving the plurality of chunks over the network connection as a single file, such as a single zip archive file, the user device may convert the chunks back into fragments by uncompressing or otherwise unencapsulating the file received over the network connection and store the fragments in an internal memory of the user device. Alternatively, the user device may store the single file obtained from the HTTP connection "as is" for later conversion to fragments by a local web server application on the user device and then for playback by a media player application on the user device.

FIG. 8 shows a client-server environment 800 according to some embodiments, in which content desired by a client 805 located in an external network 865 such as a WAN, may be provided by a download server 810 located in an internal network 850, where the content may be passed via a network connection 815 through a network boundary 860 separating the internal network 850 and the external network 865. The passing of content from the download server 810 to the client 805 may alternatively be accomplished by way of an HTTP connection over the Internet or over a LAN. The download server 810 receives a request sent by the client 805 for specific content, such as a request for a specific video to be viewed by the client 805. The download server 810 may obtain the desired content from an origin, such as from a content server. The desired content may be obtained as unencoded video data, or as lightly encoded video data. A transcoder 820 may encode the desired content provided from the origin to obtain encoded content, and a packager 830 may package the encoded content into a plurality of fragments as soon as the encoded content is output by the transcoder 820. Each fragment may correspond to two or three seconds of the desired content, by way of example, whereby thousands of fragments may make up the desired content (e.g., a full length movie).

The desired content, which may be received by the transcoder 820 as a live video stream in some embodiments, may be encoded by the transcoder 820 into a plurality of files having a particular format. By way of example, the video may be encoded into a mezzanine format as a collection of MBR-encoded files, whereby the mezzanine format may comprise an MPEG-2 file format or an ISO MPEG file that comprises lightly compressed video data obtained from the origin. The download server 810 may control a packager 830 to create fragments corresponding to a client-requested profile from the mezzanine files output by the transcoder 820. In some embodiments, the packager 830 comprises a just-in-time packager that packages data as soon as that data is received from the transcoder 820, for output to the download server 810. The download server 810 may incorporate the fragments into a plurality of chunks for delivery to the client as an ABR-encoded data stream sent over an HTTP network connection, whereby each chunk may comprise a plurality of compressed fragments. Alternatively, the packager 830 forms the chunks from fragments. The chunks may then be sent by the download server 810 to the client 805 from the internal network 850 to the external network 865 over the network boundary 860 via a network connection 815, in a file structure format 500 as shown in FIG. 5 or a file system format 700 as shown in FIG. 7.

The sending of the encoded-and-packaged data by the download server 810 as chunks of data in a chunked data transfer over the network boundary 860 may begin before all of the content corresponding to the entire amount of data requested by the client 805 has been obtained from an origin (e.g., content server), encoded by the transcoder 820 into a plurality of encoded fragments, and packaged into a plurality of chunks by the packager 830. This is because the use of a chunked data transfer scheme enables the download server 810 to start sending some of the content to the client 805 before all of the content making up an entire requested video or other requested content has been encoded by the transcoder 820 and packaged by the packager 830. The download server 810 may cause the chunks of data output by the packager 830, to be sent over the network connection to the client 805 as a single stream of data, which appears to the client 805 as a single compressed or otherwise encapsulated file (e.g., a single zip archive file, or a single Tar file, or a single RAR file, or a single 7z file), and which comprises a plurality of fragments corresponding to the client's desired content after being uncompressed or otherwise unencapsulated by the client 805. Thus, instead of receiving plural files respectively corresponding to plural fragments whereby the incorrect reception of one or more of the fragments may result in the client 805 not being able to play a movie when the client is offline from a network, the client 805 receives a single file comprising all of the fragments. The compressed or otherwise encapsulated file may then be uncompressed or otherwise unencapsulated by the client 805 to obtain the plural fragments making up a movie, and then the client 805 may play a movie corresponding to the plural fragments when the client 805 is offline from the network.

The download server 810 may monitor the download progress by storing information regarding the download progress in a download server database 840. For example, if the total amount of content to be sent to the client comprises 163 chunks, and at a particular point in time 37 chunks have been sent to the client 805 over an HTTP connection, that information may be stored in the download server database 840. Notification that the network connection 815 is lost at some point in time during the sending of the content from the download server 810 to the client 805 may be via a loss-of-network-connection notification sent from the client 805 to the download server 810. The loss-of-network-connection notification may comprise information identifying the total number of bytes properly received by the client 805 prior to the loss of network connection, and the download server 810 may access information stored in the download server database 840 to determine which chunk of the plurality of chunks sent to the client 805 corresponds to the byte value at which the loss of network connection 815 occurred. When the network connection 815 is reestablished between the download server 810 and the client 805 at a later point in time, the download server 810 may resume the data transfer at the beginning of one of the chunks that was being sent to the client 805 when the loss of network connection 815 occurred.

As shown in FIG. 8, in some embodiments, the client 805 may comprise: 1) a downloader 870 that downloads data received from the download server 810 over the network connection 815, 2) an ABR engine 875, 3) a file system storage 880 that stores the data received over the network connection 815, and 4) a local web server application 885. The ABR engine 875 may perform adaptive bit rate control on the data downloaded by the downloader in the file system storage 880 to stream video data for playback by the client 805.

In some embodiments in which the content received by the client 805 from the download server 810 has been unencapsulated (i.e., unzipped) prior to being stored in the file system storage 880, the ABR engine 875 may obtain the (unzipped) manifest from the unzipped content and retrieve the (unzipped) fragments from the unzipped content in a particular order from the file system storage 880, for playback at a later point in time when the client 805 is not connected to the WAN 865 or to any other network. In other embodiments, the file system storage 880 may store the chunks of data as a single zip archive file in the same format as provided by the download server 810 to the client 805, to save on storage space. The local web server application 885 may retrieve the single zip archive file from the file system storage 880 and convert the single zip archive file into fragments upon receiving a request from the client 805 for playback of a video. That way, a standard ABR engine may be used by the client 805 to play back the fragments in a particular order based on a manifest provided in the data obtained from the download server 810. A standard ABR engine does not have the capability to perform chunk-to-fragment conversion, and as such may play a video from the fragments in the same manner as if the standard ABR engine was connected to receive fragments of video directly from a content server or from the download server in a live video stream playback mode.

The data downloaded by the downloader 870 from the network connection 815 into the file system storage 880 may comprise one large compressed file (e.g., 500 Mbytes or greater in size), such as a large zip archive file, and may be stored in the file system storage 880 in that manner. In some embodiments, the ABR engine 875 may convert the one large file comprising a plurality of chunks that may be encoded at multiple bit rates back into fragments and then into one or more video files and/or audio files for playback by the ABR engine 875 based on the manifest that identifies the order of the fragments to be played by the ABR engine 875. In other embodiments, the local web server application 885 may convert the zip archive file comprising a plurality of chunks into fragments, for playback by the ABR engine 875, in which case the ABR engine 875 operates in the same manner as it would when live content is downloaded to the client 805 as a plurality of fragments received over the network connection 815.

The first chunk of the downloaded content received by the client 805 may comprise a manifest file that designates the fragments that are provided in each of the chunks associated with the downloaded content, whereby each fragment is effectively an uncompressed file encapsulated within the single zip archive file that comprises thousands of files (each file being a separate fragment). The manifest may be used to convert the chunks of data back into fragments and then to play back the fragments in a particular order for playback of a video. In some embodiments, the manifest may comprise information of the respective bit rates associated with the encoding of each of the chunks by the download server 810.

By way of one or more embodiments described herein, a content delivery device may combine many fragments of video data or video and audio data obtained from a content storage device into a single file from a point of view of a user device, and may send that data to the user device in a streaming manner (e.g., via a chunked HTTP connection). As such, the content delivery device need not wait for all of the fragments to be fetched from the content storage device and encapsulated into a single file before the content delivery device begins transferring data corresponding to a requested video to the user device. Further, the user device may receive the benefits of the fragments being placed into a single file (from the viewpoint of the user device) and not into separate files by the content delivery device, while also retaining the ability for the content delivery device to restart a download where it left off if the chunked HTTP connection is interrupted for some reason during the data transfer process. Also, since the data sent by the content delivery device to the user device over the network connection is an encapsulated version of the data obtained by the content delivery device from the origin, all of the pertinent DRM data, content expiration information, and content change information associated with that data may be passed on to the user device in the same manner as when the content is being downloaded to the user device when playing a live video stream while the user device is connected to the network.

In other embodiments, a video source server where the content requested by the user device is stored may perform the converting of fragments into chunks and the sending of the chunks of data via a network connection directly to the user device. In these embodiments, the processings performed by the content delivery device as described above with respect to some embodiments may be performed instead by the video source server, whereby the video source server may create a zip archive file comprising chunks of fragments from the stored content that are sent directly to the user device (and essentially having the video source server also operate as a content delivery device). The user device may then unzip the zip archive file to obtain the fragments, for later playback of the content by a media player application of the user device.

In further embodiments, higher quality of service (QoS) playback may be achieved by the user device sending different requests with different selection parameters, each one associated with a different QoS for play back of content by the user device. Based on a particular selection parameter provided by the user device, the content delivery device may increase or decrease the buffer size of available fragments to be sent to the user device, to meet the particular QoS requirement. Increased buffer size may be used to allow for playing of video when a network connection is down, whereby the fragments stored in the buffer may be used while a network connection is down to maintain a particular QoS requirement until the network connection is back up. This may provide for packet loss protection in the event of a network failure while streaming live content over the network.

In yet other embodiments, chunked data transfer of content from a content delivery device to a user device may be performed to achieve playback of content (e.g., online high speed streaming) from a previous point in time as compared to a current point in time (e.g., to play back a movie starting 10 minutes into the movie, when the movie is currently being played at a point one hour into the movie by the user device). A time-shift buffer may be provided at the user device to retrieve the chunks of data to allow play back of a movie, sporting event, or other content at a point in time prior to when the content is currently being played by a media player of the user device. For example, if a media player of the user device is currently playing video obtained from chunk #15 and a user desires to rewind back to see video from chunk #3 onward, the time-shift buffer obtains chunks #3 to #15 from the internal storage of the user device and converts the chunks into fragments (which may involve using the local web server application unzipping a zip archive file to obtain the necessary fragments as described earlier), for playback of the content by a media player of the user device starting at an earlier point in time. Instead of storing the content on a set-top box, the content may be replayed directly from the user device using the fragments obtained from the zip archive file stored by the user device.

In still further embodiments, the zip archive file obtained by the user device may be stored in the Cloud or in some storage external to the user device, due to memory constraints of the user device. The zip archive file may be obtained by the user device using a web server application by inputting the uniform resource locator (URL) corresponding to where the zip archive file is stored in the Cloud, for later playback by the user device, or for later playback by another device that is provided access to the location of the zip file in the Cloud by the user device.

The foregoing disclosure provides illustration and description, but is not intended to be exhaustive or to limit the implementations to the precise form disclosed. Modifications and variations are possible in light of the above disclosure or may be acquired from practice of the implementations. By way of example, the compression creation unit 420 of FIG. 4 and the compression creation unit 630 of FIG. 6 may comprise one of more functions provided by the transcoder 820 of FIG. 8, the transfer encoding unit 440 of FIG. 4 and the transfer encoding unit 640 of FIG. 6 may comprise one of more functions provided by the packager 830 of FIG. 8, and the processor 660 of FIG. 6 may comprises one of more functions provided by the download server 810 of FIG. 8 in some embodiments.

One or more embodiments may be applied to pack-and-go schemes in which, based on a single request for content, such as a single request made by a user device for content corresponding to a television program, a content delivery device can receive the request, determine an appropriate amount of resources to fulfill the request, obtain the fragments associated with the content from a content storage device, and send the requested content to the user device in a plurality of chunks that are encapsulated into a single archive file and sent to the user device via a chunked network connection, such as an HTTP chunked network connection.

As used herein, the term component is intended to be broadly construed as hardware, firmware, and/or a combination of hardware and software.

While some examples have been described above in the context of television technology and communications, aspects of this disclosure may readily be applied to, and adapted to be operative on, one or more other communication systems. Those communication systems may comprise computer networks, satellite networks, cellular networks, and the like.

Various aspects described herein may be embodied as one or more methods, systems, apparatuses, and/or as transitory and/or non-transitory computer-readable media storing program code executable by a central processing unit. Accordingly, those aspects may take the form of an entirely hardware embodiment, an entirely software embodiment, an entirely firmware embodiment, or an embodiment combining software, firmware, and/or hardware. The functionality may be resident in a single computing device or application, or may be distributed across multiple computing devices/platforms or applications, the multiple computing devices/platforms optionally being connected to one another via one or more networks. Moreover, the structural components described herein may be distributed amongst one or more devices, optionally within a common housing or casing.

Various signals representing content, data, or events as described herein may be transferred between a source and a destination in the form of electromagnetic waves traveling through signal-conducting media such as metamanifel wires, optical fibers, and/or wireless transmission media (e.g., air and/or space).

The methodological acts and processes described herein may be tied to particular machines or apparatuses. For example, as described herein, fragments or segments may be generated at one or more devices, such as servers and user devices. More generally, one or more apparatuses may comprise one or more processors and memory storing instructions, that when executed by the one or more processors, cause the one or more apparatuses to perform the methodological acts and processes described herein. Furthermore, the methodological acts and processes described herein may perform a variety of functions including transforming an article (e.g., content asset) into a different state or thing (e.g., fragments or segments that may be arranged as part of a content asset or playlist, potentially adhering to an on-demand pull model).

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above in any order. It will also be appreciated and understood that modifications may be made without departing from the true spirit and scope of the present disclosure. The description is thus to be regarded as illustrative instead of restrictive on the present disclosure.

What is claimed is:

1. A method comprising:
   receiving, by a computing device from a user device via a network, a request for content comprising video data;
   obtaining, by the computing device, a plurality of data fragments of the content;
   forming, by the computing device, the plurality of data fragments into a chunk of data;
   sending, by the computing device while continuing to obtain one or more of the data fragments, a portion of the chunk of data to the user device via a network connection, and determining, during the sending, an amount of the content that has been sent from the computing device to the user device;
   determining that a failure of the network connection has occurred between the computing device and the user device;
   determining, by the computing device, that the network connection has been re-established between the computing device and the user device; and
   restarting sending of the content to the user device starting from a point in the content where sending of the portion of the chunk of data had stopped due to failure of the network connection, the point in the content being determined in accordance with the amount of the content that has been sent from the computing device to the user device,
   wherein the chunk of data is capable of conversion into data fragments, of the content, for offline playback by the user device.

2. The method according to claim 1, wherein the forming comprises:
   forming a data portion of the chunk of data by aggregating the plurality of data fragments; and
   determining a size of the data portion comprising the chunk of data; and
   forming a header portion of the chunk of data, wherein the header portion comprises information as to the size of the data portion of the chunk of data.

3. The method according to claim 2, further comprising:
   sending, after having sent the chunk of data to the user device, additional chunks of data via the network connection to the user device, wherein each of the additional chunks of data comprises a plurality of data fragments of the content, wherein a last chunk of the additional chunks of data comprises a header portion indicating that the last chunk of the additional chunks of data does not comprise video data, thereby signifying to the user device that no more data fragments of the content will be sent from the computing device to the user device via the network connection.

4. The method according to claim 3, wherein the network connection comprises a hypertext transfer protocol (HTTP) connection.

5. The method according to claim 3, wherein the chunk of data and the additional chunks of data sent to the user device via the network connection collectively correspond to a single data file from a point of view of the user device.

6. The method according to claim 1, further comprising:
   sending a request, from the computing device to a storage device storing the content, for a manifest, the manifest comprising information regarding one or more files associated with the request for content; and
   receiving, by the computing device, the manifest sent from the storage device; and
   forming, into the chunk of data, the manifest,
   sending by the computing device after sending the chunk of data to the user device, a second chunk of data that comprises a plurality of fragments of the video data different from the plurality of fragments comprising the chunk of data, wherein the second chunk of data does not comprise the manifest,
   wherein the chunk of data and the second chunk of data are sent consecutively to the user device from the computing device via the network connection.

7. The method according to claim 1, wherein the request for content comprises selection parameters associated with the user device.

8. The method according to claim 7, wherein the selection parameters comprise screen resolution information or screen size information associated with the user device.

9. The method according to claim 1, the determining the amount of content that has been sent from the computing device to the user device further comprising:
   determining, during the sending, a percentage amount of the content that has been sent to the user device prior to failure of the network connection,
   wherein the restarting sending of the content to the user device further comprises:
   restarting sending of the content to the user device based on the percentage amount of the content that has been sent to the user device prior to failure of the network connection.

10. A non-transitory computer readable medium storing a computer program, which, when executed by a computing device, causes the computing device to perform the following:

receiving, from a user device via a network, a request for content comprising video data;

obtaining a plurality of data fragments of the content;

forming the plurality of data fragments into a chunk of data;

sending, to the user device, via a network connection, and while continuing to obtain one or more additional data fragments of the content, a first portion of the chunk of data;

determining, after initiating the sending of the first portion, that a failure of the network connection has occurred between the computing device and the user device;

determining the first portion;

determining, after the determining of the first portion, that the network connection has been re-established between the computing device and the user device;

determining, based on the re-establishment of the network connection between the computing device and the user device, a second portion of the chunk of data, wherein the second portion of the chunk of data is determined based on the first portion of the chunk of data, and sending the second portion of the chunk of data to the user device via the network connection, the first portion and the second portion collectively comprising the chunk of data, wherein the chunk of data is capable of conversion into data fragments, of the content, for offline playback by the user device.

11. The non-transitory computer readable medium according to claim 10, the computer program further causing the computing device to perform the following:

sending a request for a manifest to a storage device storing the content, the manifest comprising information regarding one or more files associated with the request for content;

receiving the manifest sent from the storage device; and forming, into the chunk of data, the manifest, sending, to the user device after sending the first and second portions of the chunk of data to the user device, a second chunk of data that comprises a plurality of fragments of the content different from the plurality of fragments comprising the chunk of data, wherein the second chunk of data does not comprise the manifest, wherein the chunk of data and the second chunk of data are sent consecutively to the user device from the computing device via the network connection.

12. The non-transitory computer readable medium according to claim 10, wherein the request for content sent from the user device to the computing device comprises selection parameters associated with the user device.

13. The non-transitory computer readable medium according to claim 12, wherein the selection parameters comprise screen resolution information or a Quality of Service parameter associated with the user device.

14. The non-transitory computer readable medium according to claim 10, wherein the chunk of data sent by the computing device to the user device is sent over an HTTP connection.

15. The non-transitory computer readable medium according to claim 14, wherein the chunk of data sent to the user device over the HTTP connection corresponds to a single data file from a point of view of the user device.

16. The non-transitory computer readable medium according to claim 10, wherein the determining the first portion further comprises:

determining, during the sending, a percentage amount of the content that has been sent to the user device prior to failure of the network connection, wherein the determining the second portion of the chunk of data further comprises:

determining the second portion of the chunk of data based on the percentage amount of the content that has been sent to the user device prior to failure of the network connection.

17. A method comprising:

sending, by a user device to a content delivery device, a request for content comprising video data;

receiving, by the user device as sent from the content delivery device via a network connection, a plurality of chunks of data encapsulated by the content delivery device within a single file;

unencapsulating, by the user device, the plurality of chunks of data to obtain a manifest and a plurality of fragments, the manifest including information of a playback order of the plurality of fragments;

storing, by the user device, the manifest and the plurality of fragments, for playback of the content at a later time by the user device;

determining an amount of data received by the user device, via the network connection, in the plurality of chunks of data; and notifying the content delivery device, by the user device, after the determining, and based on a failure of the network connection, of the amount of data received by the user device via the network connection prior to failure of the network connection.

18. The method according to claim 17, wherein the network connection comprises an HTTP chunked network connection.

19. The method according to claim 17, wherein the sending comprises:

sending, by the user device to the content delivery device, selection parameters comprising screen resolution information or screen size information associated with the user device.

20. The method according to claim 17, further comprising:

determining that one of the plurality of chunks of data received by the user device via the network connection does not comprise video data, based on analyzing information within a header portion of the one of the plurality of chunks of data; and based on the determining, storing, as a single file, the video data received via the network connection as comprising a first chunk of the plurality of chunks of data up to the one of the plurality of chunks of data.

* * * * *